Nov. 19, 1968      F. L. ROSE      3,411,534
FOUR-WAY VALVE
Filed Dec. 28, 1966      3 Sheets-Sheet 1
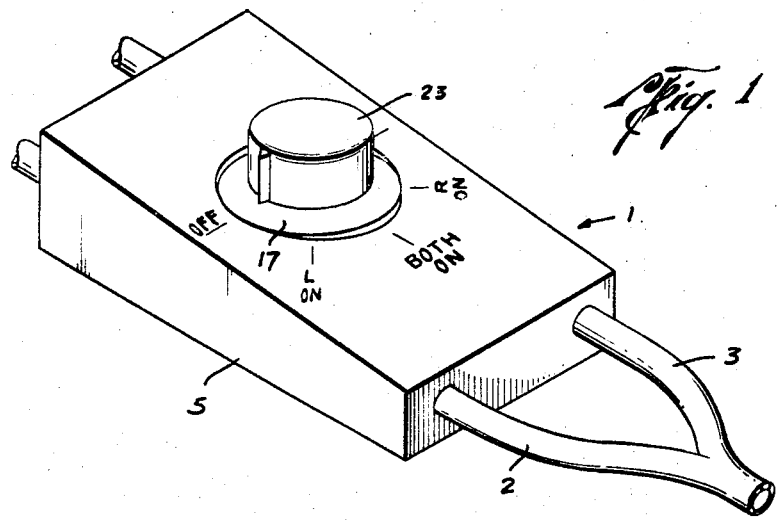
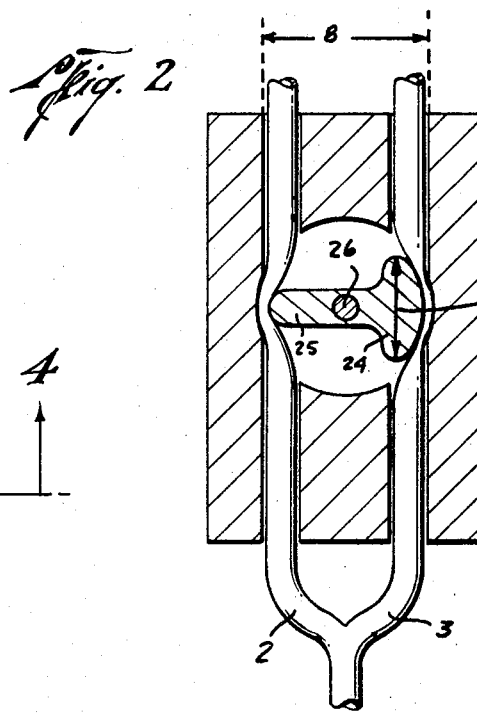
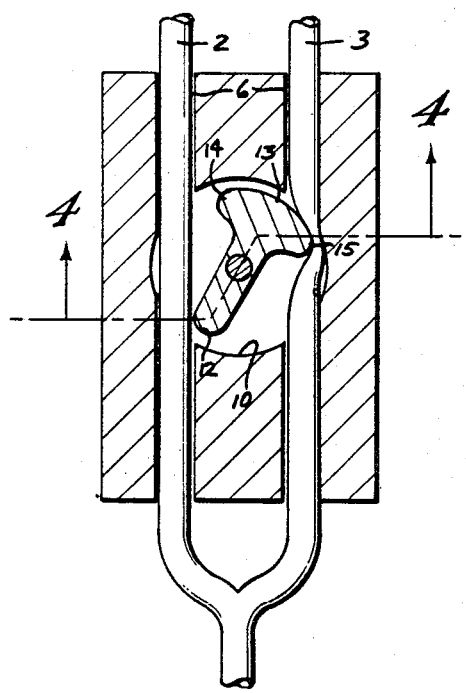
Frank L. Rose
INVENTOR
BY *Arnold and Roylance*
ATTORNEYS Nov. 19, 1968   F. L. ROSE   3,411,534
FOUR-WAY VALVE
Filed Dec. 28, 1966   3 Sheets-Sheet 2

Frank L. Rose
INVENTOR

BY Arnold and Roylance
ATTORNEYS

Nov. 19, 1968 F. L. ROSE 3,411,534
FOUR-WAY VALVE

Filed Dec. 28, 1966 3 Sheets-Sheet 3

Frank L. Rose
INVENTOR

BY Arnold and Roylance
ATTORNEYS

United States Patent Office 3,411,534
Patented Nov. 19, 1968

3,411,534
FOUR-WAY VALVE
Frank L. Rose, Cleveland Heights, Ohio, assignor to Tracor, Inc., Austin, Tex., a corporation of Texas
Filed Dec. 28, 1966, Ser. No. 605,350
8 Claims. (Cl. 137—595)

ABSTRACT OF THE DISCLOSURE

A four-way valve having two flexible tubes mounted in a housing, a cam element mounted for rotation in said housing and said cam having operative portions for selective pinching contact with either one, none, or both of said tubes to control fluid flow.

---

This invention relates to a 4-way valve for use with a couple of generally parallel flexible tubes. Specifically, the invention relates to a valve which is capable of simple and reliable operation to leave both of said tubes open, close both of said tubes, or selectively leave either one of said tubes open while closing the other tube.

In many applications where a couple of flexible tubes in generally parallel orientation are employed, as the double drain tubes used for medical purposes, it is often desired to shut off flow in one or the other of the tubes, while continuing flow in the other tube. Further, it is sometimes desirable to shut off flow in both tubes, and it is sometimes desirable to allow fluid flow through both tubes simultaneously. In the past, it has been customary to employ clamps on each tube individually, the flow through each of the tubes being controlled by operation of the respective clamp. With this system, it is difficult to close or open each tube at the same instant, if that is desired, and at any rate this cannot be done with one hand. No matter how the operations are carried out, it is often cumbersome to maintain and employ separate controls for the two lines.

The present invention provides a valve which is useful in those instances where a pair of generally parallel flexible tubes are employed for the transfer of fluids, and provides in this context a valve which is capable of leaving both tubes open, closing both tubes, or selectively closing one or the other of the tubes. In order that the invention may be clearly understood in greater detail, reference is made to the embodiments of the invention illustrated in the accompanying drawings, which form a part of this specification and wherein:

FIGURE 1 is a pictorial view of an instrument constructed in accordance with one embodiment of this invention, in use with a couple of generally parallel flexible tubes;

FIGURE 2 is a horizontal cross-sectional view taken through the instrument illustrated in FIGURE 1, illustrating the valve in a first position wherein both tubes are closed;

FIGURE 3 is a view similar to FIGURE 2, illustrating the valve in a second position, wherein one tube is closed;

Figure 5:
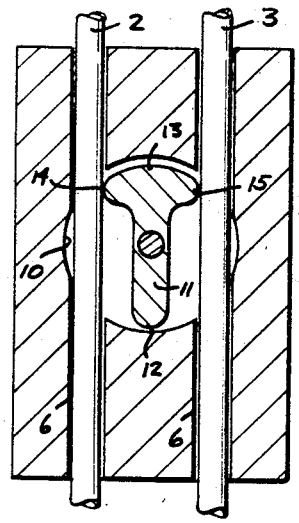
FIGURE 5 is a view similar to FIGURES 2 and 3, illustrating the valve member in a third position, wherein both tubes are open.

Referring now in more detail to the drawings, a 4-way valve 1 in accordance with the invention is illustrated in FIGURE 1. The instrument 1 comprises a housing 5 which may be of any suitable configuration but which in this embodiment is a 6-sided generally solid case. The case may be made of any suitable material such as a synthetic polymeric material. Longitudinally through the housing 5 extend a couple of generally cylindrical passageways 6, through which are adapted to be placed a couple of flexible tubes 2 and 3, such as double drain tubes. At least in the central part of the housing 5, the cylindrical openings are longitudinally parallel-extending.

As seen in FIGURES 2–7, a generally cylindrical bore or recess 10 is formed in the housing 5, preferably centrally disposed therein. The passageways 6 are arranged with relation to the recess 10 in a manner such that the outer wall of each such opening is approximately tangential with the recess 10, the tangent for one of the tubes being 180° from the tangent for the other tube. The tubes 2 and 3 are thus placed in the opening so that they are generally parallel therethrough.

In the recess 10 is disposed a valve member 7, which comprises generally a knob 23 which extends above the upper surface of the housing so that the valve member may be easily turned by the user. Operably connected with knob portion 23, and integral in this embodiment, is a cam element 11 which extends into the portion of the recess 10 occupied by the tubes 2 and 3.

The shape of the cam element 11 is in some features critical. In each of the illustrated embodiments, it will be seen that the cam element has a major side and a minor side. The major side includes, in each instance, at least three points on the arc of a circle. More specifically, the major side includes two points on the chord of a circle, one at the intersection of the chord with the circle on one side, and the other at the intersection of the chord with the circle on the other side. A third point on the arc is located at the intersection of the perpendicular bisector of the chord with the circle. The minor side includes at least one point on the circle, substantially 180° from the above-mentioned third point. In the illustrated embodiments, this point on the minor side is located at the intersection of the other end of the perpendicular bisector with the circle.

In the embodiments shown in FIGURES 8–12, the first and second points described above are labeled "a" and "b," and the third point on the major side is labeled "c." The above-mentioned point on the minor side is labeled "d" in each of these embodiments.

The corresponding points on the chord in the FIGURES 2–7 embodiment are 14 and 15; the third point on the major side is 13, and the point on the minor side is 12.

In the FIGURES 2–7 embodiment, the cam 11 is seen to be comprised generally of a major or pie-shaped portion 24 and a minor or radial portion 25, from a common center 26. The valve member 7 is placed in position in the recess 10 so that the center 26 of the cam is in the center of the circle formed by the cross-section of the cylindrical recess 10. The peripheral surface of pie-shaped section 24 terminates at ends 14 and 15, and this surface is arcuate and adapted to fit just inside the bore formed by the recess 10. The straight portion 25 of cam 11 extends radially from the point 26, 180° disposed from a midpoint 13 of pie-shaped portion 24, equidistant from the ends 14 and 15. The section 25 terminates at end 12 just inside the wall of recess 10, leaving a clearance sufficient to compensate for the wall thickness of the tubing used.

The diameter of the recess 10 is only very slightly larger than the distance 8 measured between the outer walls of the passageways 6. The width 16 of the pie-shaped portion of cam 11 is approximately equal to the chordal distance between the opposite ends 14 and 15 of the pie-shaped portion 24 of the cam element. As noted, points 12 and 13 are on the perpendicular bisector of the chord between points 14 and 15.

Figure 4:
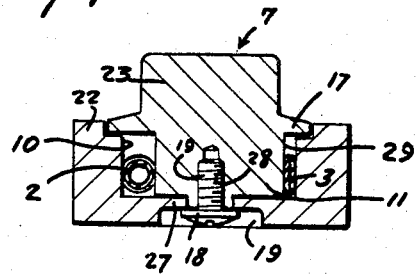
FIGURE 4 is a cross-sectional view, taken along the line 4—4 of FIGURE 3.

The specific configuration of the valve member 7 employed in this embodiment may be readily seen in FIGURE 4, where the valve member is shown in vertical cross section. Here it is seen that there is a shallow bore 19 in the bottom of housing 5, the bore terminating just before it reaches the recess 10, to form a peripheral projection 27. The valve member 7 is formed with a counterbore 28 in the bottom thereof, and a screw 18 fits into this counterbore, the head of the screw abutting the projection 27 to retain the valve member in place, but in such a manner that rotation of the valve member is permitted. Another shallow bore or annular groove is formed in the top surface of the housing 5, forming a lip 22 of the housing around this bore. Into this bore is positioned an annular flange 17 of valve member 7, which flange is in frictional engagement with the housing 5 around the periphery of the flange. The cam portion 11 of the valve member depends from the flanged portion and fits into the recess 10, one side 29 of the cam 11 being adjacent the wall of recess 10 while the opposite side is removed from the wall, thus forming an opening 21. The cylindrical knob 23 of the valve member 7 is seen to protrude above the top surface of the housing 5 to promote ease of turning the valve member from the exterior of housing 5. As is readily seen, the entire valve member 7 is free for rotation in the corresponding recessed portions of the housing 5.

The operation of the valve can be readily understood by reference to FIGURES 2 through 7.

In FIGURE 2, both the tubes 2 and 3 are closed, so that fluid may flow through neither of these tubes. In this position, the end 12 of radial portion 25 of the cam element 1 pinches the tube 2, closing that tube; and the pie-shaped portion 24 pinches the tube 3, closing that tube.

When the cam element 11 is turned, by means of the knob 23, to the left to assume the position illustrated in FIGURE 3, the end 15 of pie-shaped portion 24 of the cam element 11 remains in engagement with the tube 3, pinching that tube closed. However, because of the circumferential relationship of the portion 25 and the portion 24 of the cam element 11, the tube 2 remains open because the end 12 of portion 25 remains free of engagement with that tube. Open tube 2, and pinched tube 3, may be readily viewed in the FIGURE 4 cross-section.

Further movement of the cam element to the left, to a position illustrated in FIGURE 5 wherein the radial portion 25 of the cam element is parallel to the tubes 2 and 3, opens both tubes 2 and 3 to permit fluid flow through both tubes.

Figure 7:
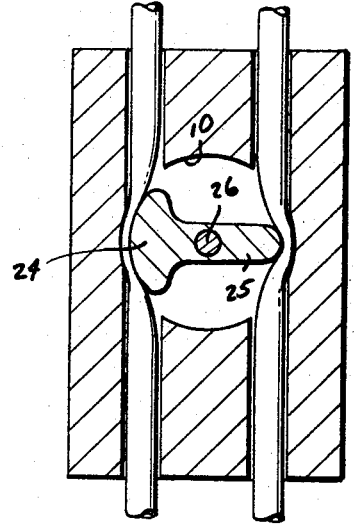
FIGURE 7 is a view similar to FIGURES 2–3 and 5–6, illustrating the valve member in a fifth position, wherein both tubes are closed.
Figure 6:
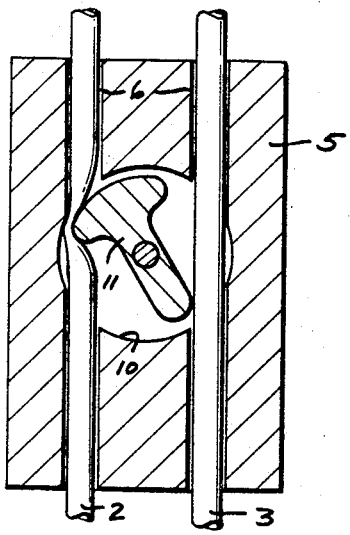
FIGURE 6 is a view similar to FIGURES 2–3 and 5, illustrating the valve member in a fourth position, wherein one tube is open.
Figure 8:
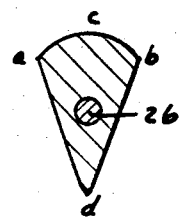
FIGURE 8 is a plan view of an alternative form of cam element for the valve of this invention.
Figure 9:
FIGURE 9 is a plan view of another form of cam element for the valve of this invention.
Figure 10:
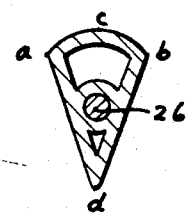
FIGURE 10 is a plan view of still another form of cam element for the valve of this invention.
Figure 11:
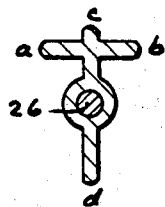
FIGURE 11 is a plan view of still another form of cam element for the valve of this invention.
Figure 12:
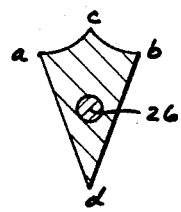
FIGURE 12 is a plan view of still another form of cam element for the valve of this invention.

Turning the cam element still further to the left, to the FIGURE 6 position, closes the tube 2 while leaving the tube 3 open. Still further movement of the cam to the left once again closes both tubes, as seen in FIGURE 7. As will be readily seen, the position of the cam in FIGURE 7 is 180° removed from the FIGURE 2 position, and similar results may be obtained by moving the cam through the remainder of its revolution back to the FIGURE 2 position.

Because of the frictional engagement of the flange 17 of the valve member with the housing 5, the cam element 11 will remain in the position to which it is set.

In the foregoing manner, th one-piece actuator of this instrument is capable of operation in connection with a couple of generally parallel flexible tubes to close both tubes, leave both tubes open, or to selectively leave either tube open while closing the other tube.

The simplicity of construction and ease of operation of this invention are apparent, and the advantages of such a construction are significant.

While the invention has been explained in terms of particularly useful embodiments, it will be understood by those skilled in the art that various changes and modifications may be made in the structures disclosed herein without departing from the scope of the invention, which is defined by th following claims.

What is claimed is:

1. A four-way valve suitable for use with a pair of flexible tubes, comprising:
    a housing which includes therein a recess;
    a pair of passageways extending through said housing, said passageways being aligned with said recess so as to extend therethrough and be substantially parallel therein;
    a flexible tube fitting in each of said passageways;
    a valve member in said recess, said valve member including a knob portion which may be controlled from the exterior of said housing, and a cam element operably connected with said knob portion and having at least three spaced points on an arc of a circle, and another point 180° disposed from the midpoint of said arc,
    whereby said cam element may be turned so that fluid flow may be selectively allowed through either of said tubes, neither of said tubes, or both of said tubes simultaneously.

2. A valve suitable for use with a pair of generally parallel flexible tubes, comprising:
    a cam element for selectively contacting said tubes and having a major side and a minor side,
        said major side including at least first and second points on the chord of a circle, one of said points being located at the intersection of one end of said chord with said circle, and one of said points being located at the intersection of the other end of said chord with said circle, and at least a third point located at the intersection of the perpendicular bisector of said chord with said circle, and
        said minor side including at least one point on said circle, substantially 180° disposed from said third point,
    whereby said cam element may be turned so that fluid flow may be selectively allowed through either of said tubes, neither of said tubes, or both of said tubes simultaneously.

3. A valve suitable for use with a pair of generally parallel flexible tubes, comprising:
    a housing having a recess therein;
    a pair of generally parallel passageways extending through said housing, each of said passageways being aligned with said recess;
    a flexible tube disposed in each of said passageways;
    a cam element disposed in said recess, said cam element having a major side and a minor side,
        said major side including at least first and second points on the chord of a circle, one of said points being located at the intersection of one end of said chord with said circle, and one of said points being located at the intersection of the other end of said chord with said circle, and at least a third point located at the intersection of the perpendicular bisector of said chord with said circle, and
        said minor side including at least one point on said circle, substantially 180° disposed from said third point; and,
    a knob operably connected with said cam element, and operable from the exterior of said housing to turn said cam element, so that fluid flow may be selectively allowed through either of said tubes, neither of said tubes, or both of said tubes simultaneously.

4. A valve in accordance with claim 3, wherein said knob is integral with said cam element.

5. A valve in accordance with claim 3, wherein said tubes are double-drain tubes.

6. A valve in accordance with claim 3, wherein said knob contains an annular flange, and said housing includes an annular groove for receipt of said flange, whereby said knob and cam element are fixedly positioned in said recess.

7. A valve in accordance with claim 3, wherein said recess is cylindrical in configuration.

8. A valve in accordance with claim 3, wherein said cam element is symmetrical about said perpendicular bisector.

References Cited

UNITED STATES PATENTS

| | | |
|---|---|---|
| 485,698 | 11/1892 | Ketchum _____ 251—9 XR |
| 2,313,550 | 3/1943 | Huber _____ 251—7 |
| 2,556,689 | 6/1951 | Grove. |
| 2,645,245 | 7/1953 | Maisch _____ 251—7 XR |
| 2,985,192 | 5/1961 | Taylor et al. _____ 251—7 XR |
| 3,299,904 | 1/1967 | Burke _____ 251—9 XR |

FOREIGN PATENTS 164,691   12/1949   Austria.

DONALD E. WATKINS, *Primary Examiner.*